Nov. 7, 1950

H. R. HUGHES ET AL 2,529,081

APPARATUS FOR REJECTING IMPROPERLY
FILLED SOAP CONTAINERS

Filed June 25, 1945

Inventors
HARLEY ROLAND HUGHES
CURTIS DARWIN RICE

By Trenton Meredith
and George H. Mortimer
Attorneys

Nov. 7, 1950 H. R. HUGHES ET AL 2,529,081
APPARATUS FOR REJECTING IMPROPERLY
FILLED SOAP CONTAINERS
Filed June 25, 1945 3 Sheets-Sheet 2
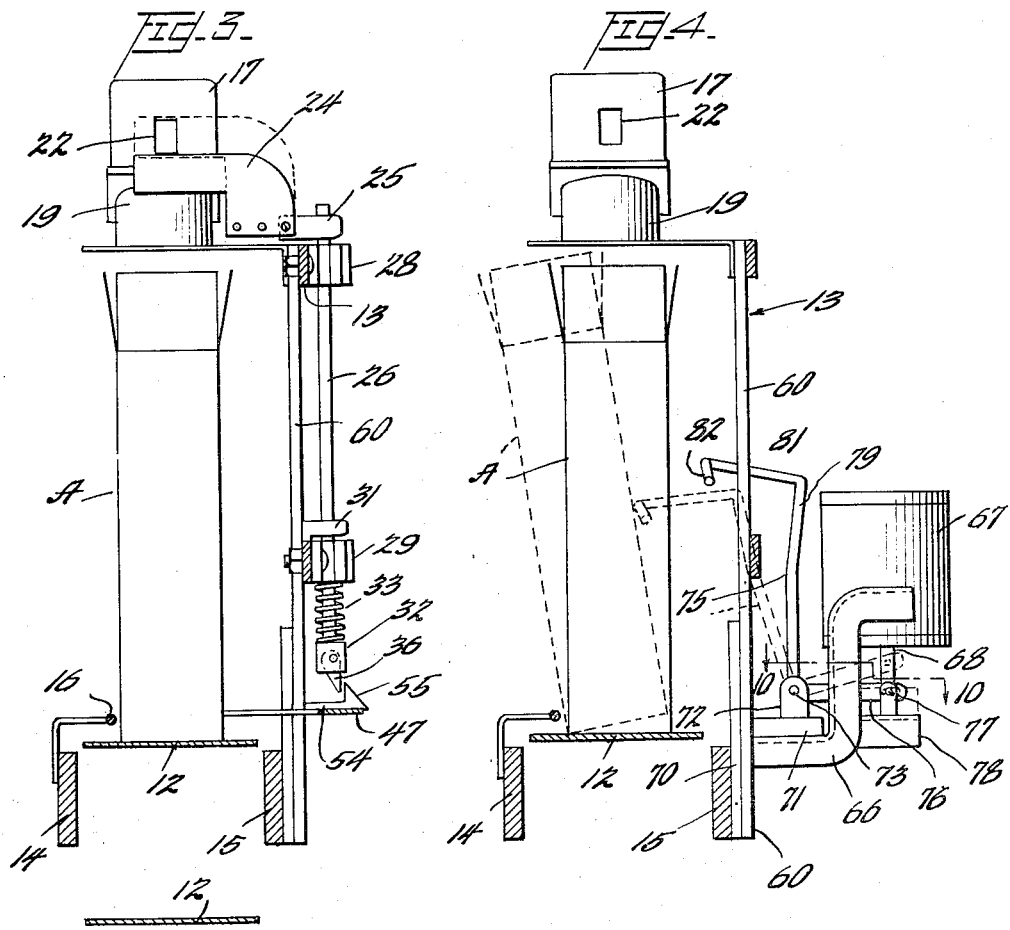
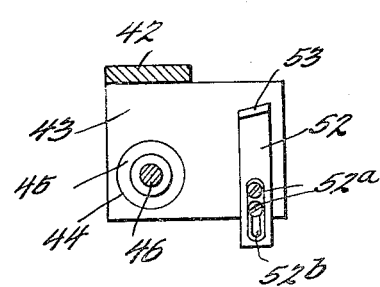
Fig. 5
Fig. 6
Inventors
HARLEY ROLAND HUGHES
CURTIS DARWIN RICE
Trenton Meredith
and George H. Mortimer
Attorneys

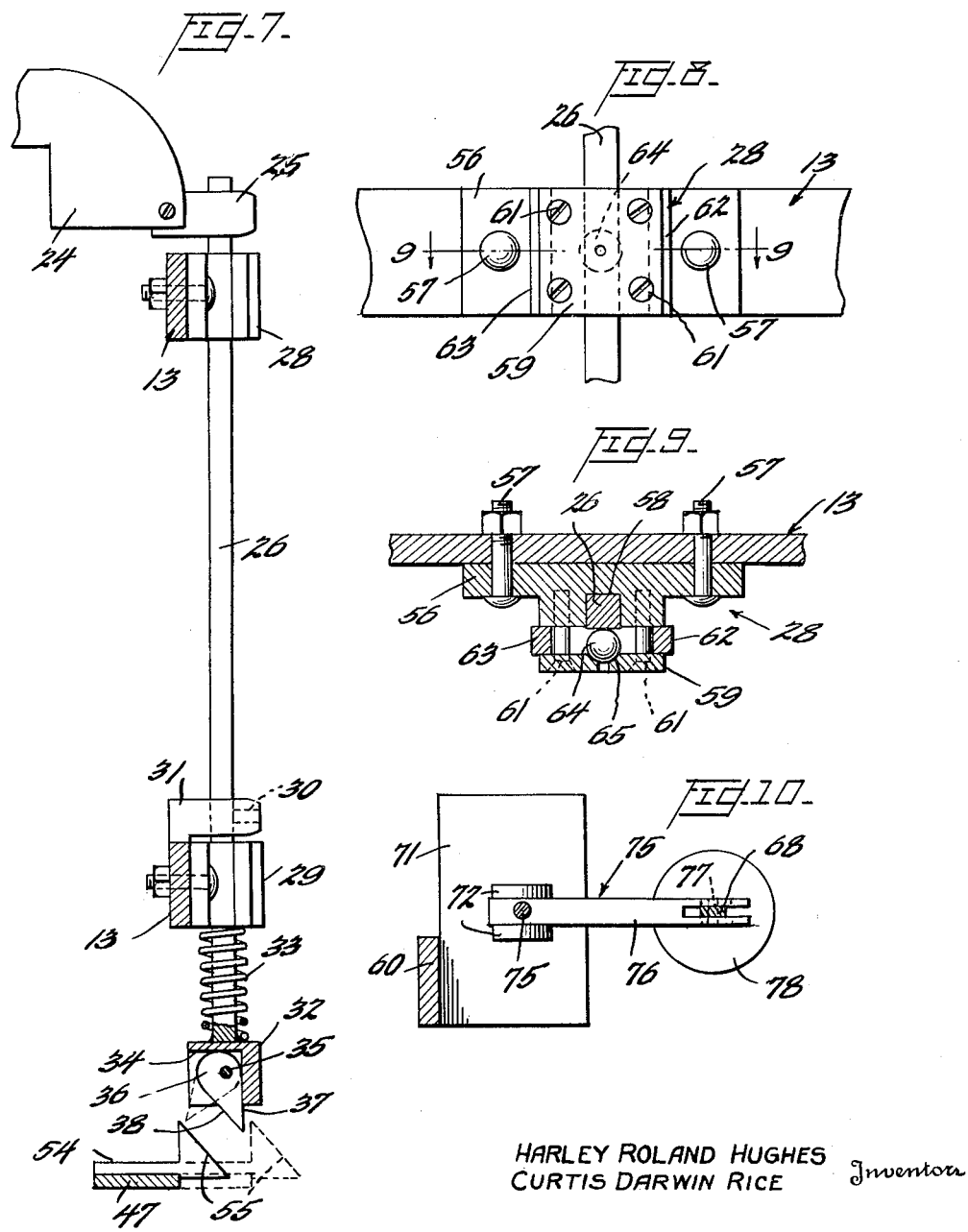

Patented Nov. 7, 1950

2,529,081

UNITED STATES PATENT OFFICE 2,529,081

APPARATUS FOR REJECTING IMPROPERLY FILLED SOAP CONTAINERS

Harley Roland Hughes, Anchorage, Ky., and Curtis Darwin Rice, Omaha, Nebr., assignors to Colgate-Palmolive-Peet Company, Jersey City, N. J., a corporation of Delaware Application June 25, 1945, Serial No. 601,530

7 Claims. (Cl. 209—82)

This invention relates to inspection apparatus and is more particularly concerned with apparatus for inspecting and/or measuring the levels of the contents of moving containers.

The preferred embodiment of the invention will be described herein as applied to the inspection of the level to which such a container has been filled with a substance such as soap powder, together with automatic mechanism for controllably timing the inspection interval so that the container itself determines and does not interfere with the inspection operations and including a suitable ejecting device for disposing of improperly filled containers.

The problem of properly filling containers with inexpensive substances such as soap powder and the like which must be solved to conform with various laws and regulations is of considerable importance and has given much trouble in the soap packaging industry. The regulations usually require that the individual container must not only contain a minimum weight of the soap powder but also that the container be filled to a specified minimum level. It is this latter requirement which is most difficult to observe, and prior to the present invention inspection for checking proper level of such containers has been to our knowledge accomplished commercially visually only by having an inspector stationed at a point on a conveyor line past which the individual open containers travel as they emerge from an automatic filling machine and before their tops are sealed down to complete packaging. This method, like all inspection methods depending upon human characteristics, is subject to defects in that the task is tiresome and the operator's attention strays frequently so that it is not reliable and not as satisfactory as is required.

Automatic methods of determining whether containers have been properly filled utilizing mechanical devices such as feeler arrangements have been tried, but to our knowledge they are complicated and expensive as well as unsatisfactory and unreliable in operation.

The present invention includes specially controlled photoelectric arrangements for scanning the content level of each individual container and for automatically ejecting packages which are not filled to the proper level within permissible limits. The term "light" as used herein of course includes both visible and invisible radiant energy.

With the above in mind it is a major object of our invention to provide apparatus for inspecting the level of a substance such as powdered soap and the like in a container operable in synchronism with positioning of the container at the inspection station.

A further object of the invention is to provide a novel inspection apparatus for accurately checking the levels of substances in a plurality of successive containers as the latter are moved past the apparatus regardless of the spacing between successive containers.

It is a further object of the invention to provide novel photoelectrically controlled apparatus for checking the content level of a moving container and ejecting an improperly filled container from a conveyor.

A further object of the invention is to provide apparatus for inspecting the level of a substance in a moving container wherein photoelectric inspection means is rendered operable by arrival of the filled container at the inspection station.

A further object of the invention is to provide a novel inspection apparatus for determining the level of a substance in a container wherein a normally inoperative photoelectric apparatus is rendered operable for inspection by movement of the container into position at the inspection station.

A further object of the invention is to provide a novel method of automatically inspecting continuously moving containers at least partially filled with a substance such as soap powder for checking the level to which they are filled.

A further object of the invention is to provide a novel apparatus for inspecting the levels of the contents of containers continuously passing an inspection station wherein photoelectric means synchronized with the movement of the container and made operable to inspect said level and controlled by movement of each container is adapted to actuate a package ejecting mechanism when the photoelectric device detects an improperly filled container.

Further objects of the invention will presently appear as the description proceeds in connection with the appended claims and the annexed drawings wherein:

Figure 3 is a partial section taken substantially along line 3—3 of Figure 1 illustrating the shutter of the photoelectric device and mechanism for actuating it;

Figure 4 is a partial section taken substantially along line 4—4 of Figure 1 illustrating operation of the automatic container ejecting mechanism of the invention;

Figure 5 is a fragmentary partial section taken substantially along line 5—5 of Figure 1 illustrating especially the stop for limiting inward travel of the shutter control lever;

Figure 6 is a fragmentary partial section taken substantially along line 6—6 of Figure 1 illustrating the pivot for the shutter control lever;

Figure 7 is an enlarged fragmentary elevation partially in section illustrating the mechanism for raising and lowering the shutter of the photoelectric device in response to movement of the container;

Figure 8 is a fragmentary end elevation diagrammatically illustrating the upper bearing support for the shutter rod;

Figure 9 is a fragmentary section taken substantially along line 9—9 of Figure 8 illustrating details of the bearing of Figure 8, and Figure 10 is a fragmentary section taken substantially along line 10—10 of Figure 4 illustrating the coupling of the container ejecting member with the solenoid.

Figure 1:
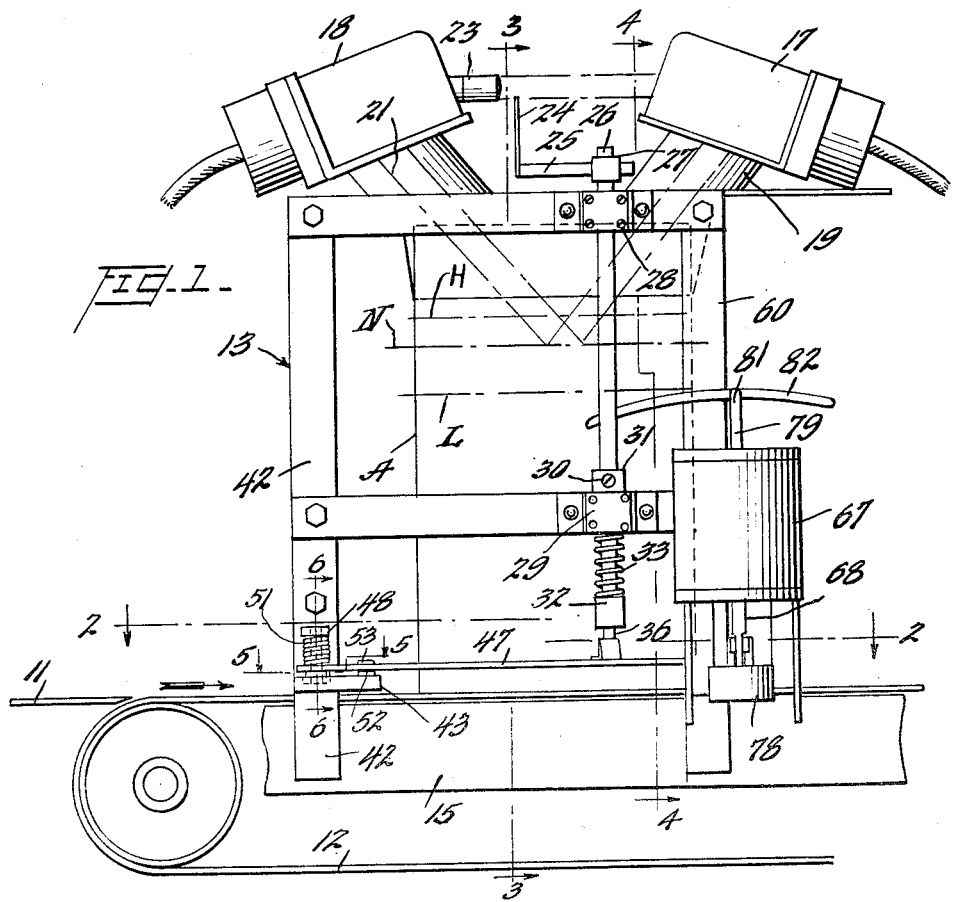
Figure 1 is a side elevation illustrating a preferred embodiment of the invention wherein photoelectric inspection is provided at an inspection station, with a partially filled container illustrated disposed in operative position at the inspection station.
Figure 2:
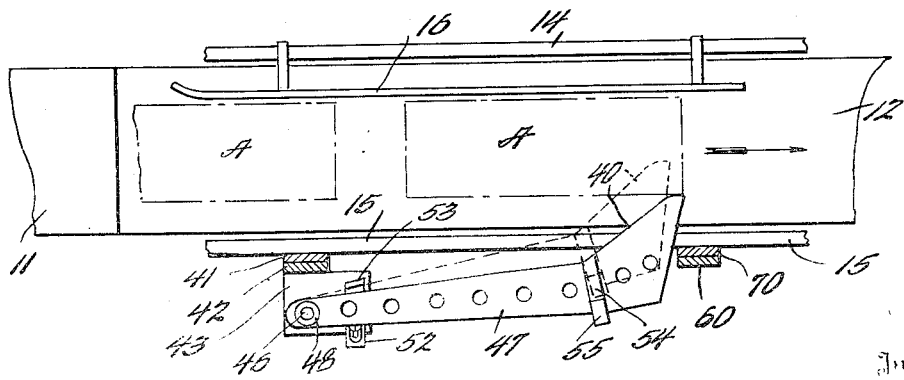
Figure 2 is a partial section taken substantially along line 2—2 of Figure 1, illustrating the manner which the container moving on a conveyor belt into and through the inspection station actuates a trip arm which controls inspection operation of the photoelectric device.

Referring now to Figure 1 which illustrates an inspection station according to a preferred embodiment of the invention for inspecting the level of substances in containers traveling on continuous conveyor mechanism between an automatic filling machine and a suitable container closing device, a delivery conveyor 11 is provided for supplying a constant succession of containers which have been filled by the automatic filling machine to an endless belt conveyor 12 which carries them through the inspection station. Conveyor belt 12 is preferably of the usual flat substantial continuously moving type providing for flat traverse of the container through the inspection station, and the illustrated containers A are the usual well known rectangular soap powder boxes. As illustrated in Figure 2, the containers are preferably delivered upright substantially centrally of the conveyor belt 12 with their top flaps open to expose the contents and travel endwise there along for actuating an inspection device as will be explained.

The inspection station comprises a rigid skeleton of frame members indicated at 13 having rigid bottom side rails 14 and 15 disposed at opposite sides adjacent the upper level of conveyor belt 12. Along one side of the inspection station, as illustrated in Figure 3, an upstanding guide member 16 rigid with rail 14 extends parallel to the path of movement of the conveyor and is disposed above the surface of the upper flight of the conveyor belt 12 for laterally locating each container to be inspected sufficiently toward the other side of the conveyor belt that it may properly actuate the photoelectric shutter control lever about to be described. Preferably guide 16 extends the length of the inspection station, and its height is such that it will not interfere with action of the ejector later to be described for ejecting an improperly filled container from the conveyor.

Figure 1 illustrates a package A in position for inspection by a photoelectric device comprised of a suitable light source housing 17 and a photoelectric cell unit housing 18. Light source housing 17 is a conventional lamp housing containing an electric lamp energized by connection of a cable to a suitable source of power and it is rigidly secured to frame 13 by a tubular support 19 which also preferably contains an internal baffle mechanism for restricting the beam of light issued by the lamp housing to a desired relatively small cross-section as illustrated at Figure 1. Tube 19 may be rigidly secured to frame 13 in any suitable manner. Photo cell housing 18 is similarly rigidly secured to frame 13 by a tubular support 21 which also may contain suitable internal baffles adapted to restrict the amount of entering light reflected from the surface of the substance in container A. Preferably the beam of light which is emitted by the lamp housing and enters photoelectric housing 18 is of regular and relatively small cross-section.

Only light which is emitted from lamp house 17 and reflected from the surface of the substance in container A is permitted to pass into the photo cell housing through tube 21, and extraneous light such as sunlight, roomlight and the like are baffled off by the tube 21 and its associated internal baffles so that uniform measurements may be obtained at all times. Housings 17 and 18 are preferably so arranged that they make equal angles with the theoretically horizontal level of the substance in the container A.

Above frame 13, lamp housing 17 is provided with a relatively rectangular slotted opening 22 (Figure 4) for horizontally emitting a small pilot beam of light which, as illustrated at Figure 1, enters a horizontal aligned tube 23 on photo cell housing 18 whereby some light from lamp housing 17 may fall directly on the photoelectric cell within housing 18 instead of being reflected from the substance in container A. Tube 23 is of such length as to baffle off extraneous light such as sunlight and roomlights, and this assures that only light from aperture 22 may enter housing 18 therethrough.

An opaque shutter 24 is provided for selective disposal in the path of the pilot light beam between aperture 22 and tube 23, and this shutter is normally out of the path of the light beam when no container is at the inspection station so that normally the photoelectric cell circuit in housing 18 continuously receives light directly from lamp housing 17, the purpose of which arrangement will later appear. Shutter 24 is fixed to a horizontal bar 25 which in turn is rigidly secured to the upper end of a vertical shutter rod 26 by a slidable adjustable fixture 27. Shutter rod 26 is mounted for vertical reciprocation on frame 13 being slidably mounted within an upper bearing assembly 28 and a lower bearing 29 carried by frame 13. Above bearing assembly 29, shutter rod 26 has adjustably fixed thereto, as by set screw 30, a projecting stop member 31 adapted to engage with its under side lower bearing member 29 which thereby limits the lower position of the shutter rod. This lower position of the shutter rod may be selectively adjusted by adjusting the position of stop 31 along rod 26, and in operation this adjustment is so made that the upper edge of shutter 24 is positioned normally just below the pilot light beam between housing 17 and 18 when there is no container operatively in the inspection station.

At its lower end, see Figure 7, shutter rod 26 has fixed thereto a head 32 which is enlarged at its upper end so as to provide a lower seat for a compression spring 33 surrounding rod 26. The upper end of spring 33 seats against bearing 29 on frame 13. The function of compression spring 33 is to normally urge shutter rod 26 downwardly so as to normally retain shutter 24 out of the path of the pilot light beam between lamp housing 17 and photo cell housing 18. The extent to which spring 33 can lower the shutter is of course regulated by the adjusted position of stop 31.

Head 32, as illustrated in Figure 7, comprises a block having an internal slot 34 within which is pivoted on a horizontal arbor 35 a trip latch member 36 which has a substantially vertical straight side 37 adapted to bear against the adjacent vertical side of groove 34 for preventing counterclockwise rotation of latch 36 beyond the full line position of Figure 7, but which may readily rotate about arbor 35 toward the dotted line position illustrated in Figure 7 in operation of the device as will later be described. Opposite straight side 37, latch member 36 is provided with an inclined cam surface 38 adapted to be contacted by a shutter control member as will be described.

Upstanding from rail 15, as illustrated in Figure 2, is a bracket member 41 to which is secured one of the vertical upright members 42 of frame 13. Upright 42 has secured thereto, as by welding, a horizontally extending platform 43 which is illustrated in Figures 1, 2, 5 and 6.

Platform 43 is provided with a recess 44 in which is press-fitted a member 45 for mounting on the platform an upstanding pivot pin 46 serving as a pivot for one end of a horizontally swingable shutter control lever 47 which is illustrated engaged by container A in Figure 2. The bore of member 45 is pressed onto pin 46 and the upper end of stationary pin 46 has rigidly secured thereto a collar 48, as by set screw 49, in spaced relation to lever 47. A coiled torsion spring 51 surrounds pin 46, with its opposite ends fixed to lever 47 and collar 48, respectively, as by thrusting the vertically bent ends of the spring into suitable apertures in the lever and collar, respectively.

Torsion spring 51 constantly urges lever 47 to rotate in a horizontal path in a counterclockwise direction in Figure 2, so that normally lever 47 will tend to dispose itself partly above conveyor belt 12 in the dotted line position illustrated in Figure 2 when there is no container at the inspection station.

Platform 43 has also mounted thereupon a projection plate 52 having an upturned end 53 serving as a stop for limiting the counterclockwise movement of lever 47 about pivot 46, and the position of stop 53 relative to lever 47 may be adjusted by means of set screws 52a disposed in a slot 52b in plate 52. It is illustrated that the inner face of stop 53 which engages the corresponding edge of lever 47 is inclined to provide proper engagement with the side of the lever as it rotates about its pivot, but this construction is not essential to operation of the stop.

Movement of lever 47 in a clockwise direction from the dotted line position of Figure 2 in response to pressure of a moving container on conveyor belt 12 is utilized in the invention to raise shutter 24 to momentarily cut off the pilot light beam for an inspection internal. This is accomplished by converting the horizontal movement of lever 47 into vertical displacement of shutter rod 26. We provide on the upper face of lever 47 a rigid trip member 54 provided with an inclined downwardly and outwardly facing cam surface 55 having substantially the same inclination and size as inclined surface 38 on trip latch member 36 at the bottom of shutter rod 26. As inclined surface 40 on the free end of shutter lever 47 is engaged and pushed outwardly by the advancing container, thus rocking lever 47 about its pivot 46 in opposition to spring 51, face 55 engages face 38 of latch member 36 which is operatively rigid, being prevented from counterclockwise rotation as above explained. This causes upward displacement of shutter rod 26 and upward displacement of shutter 24 into the path of the pilot beam of light to cut off the latter for a purpose later to appear. When face 55 passes beyond latch 36, the shutter rod is free to drop, terminating the inspection internal, to the full line position of Figure 3.

Details of bearing assemblies 28 and 29, assembly 28 being taken for detailed description, are illustrated at Figures 8 and 9. Bearing assembly 28 comprises a fastener bracket 56 which is secured to frame 13 as by bolts 57 and is formed with an outwardly spacing substantially rectangular recess 58 providing a slide guide groove for rectangular shutter rod 26. A face plate member 59 is secured to bracket 56 as by screws 61 and held in spaced relation thereto by spacer members 62 and 63, and a ball bearing member 64 is provided in the space between face plate 59 and bracket 56, face plate 59 having an internal spherical seat 65 which ball is centered with the other side of the ball bearing in point contact against the outer flat side of shutter rod 26. The purpose of this arrangement is to provide a substantially frictionless guide arrangement for shutter rod 26 while at the same time providing minimum lateral play in the guide. Bearing assembly 29 is preferably of the same construction as bearing assembly 28 and need not be described further.

Referring now to Figures 1 and 4, upright 60 has rigidly secured thereto a bracket 66 which is somewhat S-shaped in vertical plan as illustrated at Figure 4 and of generally L-shaped cross-section, for rigidly supporting a solenoid 67 within which is a vertically reciprocable plunger having a rod extension 68 below. Any suitable arrangement may be utilized for mounting solenoid 67 upon bracket 66.

Upright 60 at the side of frame 13 is secured as by bolting to reinforcing upright 70 on rail 15. Intermediate its ends, but about the level of conveyor belt 12, upright 60 has secured thereto as by welding a horizontally extending flat platform 71 having rigid upright ears 72, ears 72 being horizontally apertured in alignment to provide a mounting for a horizontal pivot 73 supporting a swingable container ejector member 75. Ejector member 75 comprises a leg 76 extending substantially horizontally rearwardly from pivot 73 to pivotal engagement at 77 with the lower end of solenoid armature rod 68, the pivotal engagement between these two members including a pin and slot arrangement to provide lost motion for rocking movement of member 75 about pivot 73 without binding. Below pivot 77, rod 68 has secured thereto a counterweight 78 to insure speedy dropping of the solenoid plunger when the latter is de-energized.

Ejector member 75 further includes a substantially upright leg 79 having a forwardly and slightly upwardly projecting arm 81 rigidly secured to an elongated pusher member 82 which is disposed parallel to the path of movement of the container to be inspected. Member 82 has a length substantially equal to one of the containers. As illustrated in Figure 1, at least a portion of the length of bar 82 is disposed coextensive with the container when the latter becomes positioned in inspection position, and pusher 82 is disposed slightly beyond the inspection station so as to be operative on the container, if necessary, directly after the inspection operation.

The energizing circuit of solenoid 67 is controlled by the circuit of light sensitive unit 18 which contains suitable amplifying means and controls a suitable switching device in the solenoid circuit. Normally solenoid 67 is de-energized, so that counter-weight 78 holds the armature rod 68 down in the full line position of Figures 1 and 4 and maintains member 75 in the upright position of Figure 4 where it does not interfere with movement of the container through the inspection station. However, when it is detected that a container is improperly filled, the solenoid is energized by the photoelectric device and armature rod 68 is pulled upwardly to displace bar 82 laterally against the side of container A which is thereupon pushed off the conveyor belt 12 and does not pass materially beyond the inspection station.

Operation

In operation, a series of successive containers coming from an automatic filling machine pass from conveyor 11 onto the continuous conveyor belt 12. As will appear, it is immaterial what is the longitudinal spacing of these containers since the interval during which they are inspected by the photoelectric mechanism is essentially dependent upon the positioning of a container at the inspection station.

Photo tube assembly 18 is so biased that the quantity of light from aperture 22 alone when permitted to enter through tube 23 is sufficient to energize the photoelectric cell so as to maintain inactive the control circuit for energizing solenoid 67. Thus, when there is no container in the inspection station, shutter 24 remains lowered, the photo cell at 18 maintains the circuit of solenoid 67 de-energized, and counter-weight 78 maintains ejector member 75 upright in the full line position of Figure 4. The photo tube assembly is also so biased that it will operate to energize the solenoid circuit only when the photoelectric cell receives total light below a certain amount.

As the first container A travels into and through the inspection station, referring now to Figure 2, its leading edge contacts the inner inclined surface 40 of lever 47 and forces lever 47 outwardly about its pivot 46, this movement of the lever causing cam face 55 to engage corresponding inclined cam face 38 on trip latch member 36 and raise shutter rod 26 upwardly to locate shutter 24 in the patch of the pilot light beam from aperture 22.

As the container A advances along the inspection station and forces lever 47 outwardly, by the time lever 47 reaches the solid line position illustrated in Figure 2, trip member 54 will have passed beyond trip latch 36 to the dotted line position shown in Figure 7, so that the shutter rod is now free to drop by its own weight and under the influence of compression spring 33, thereby removing shutter 24 from the path of the pilot light beam. Thus it will be seen that we have provided means for momentarily cutting off the pilot light beam from aperture 22, so that the photo cell assembly 18 is for a predetermined interval energized solely by light reflected from the surface of the substance in the particular container A at the inspection station.

All the time that each container A is advancing into the inspection station and moving lever 47 back far enough until it starts to raise shutter 24, solenoid 67 is de-energized because the amount of light from aperture 22 passing into the photo cell assembly is by itself sufficient to maintain the solenoid circuit de-energized. However, during the small period when shutter 24 cuts off the light of the pilot beam, the only light than can reach the photo cell is that of the main beam which is directed from housing 17 downwardly onto the surface of the substance within the container and reflected upwardly into the photo cell assembly. Usually an amber light filter is provided in the path of this beam in order to compensate for differences in color of different batches of powdered soap material, and where the contents of container A are powdered soap as this will insure a uniform response to the action of the device. When the level of the substance in container A is proper as indicated at N in Figure 1, it will be seen that the descending angular light beam emitted by lamp house 17 will be substantially fully reflected into the photo cell housing and the circuits are so biased and adjusted that if substantially all of this reflected light is directed into the photo cell it will remain so biased as to retain the solenoid circuit de-energized even during the period that the pilot beam is cut off.

However, suppose that the container is filled only to the lower level indicated at L in Figure 1, it will be seen that light from lamp house 17 during the interval that the shutter is cutting off the pilot beam will be directed mainly to one side of the photo cell and the photo cell will not receive sufficient light therefrom to remain excited. The photo cell circuit is so biased that when the exciting light level is cut off or falls below a predetermined amount, such results in energization of the solenoid circuit which pulls the armature rod 68 upwardly and thereby rocks ejector 75 counterclockwise about its pivot 73 so as to push improperly filled container A off the conveyor belt 12 as indicated in Figure 4. This ejector action is automatic whenever an improperly filled container is detected by the scanning action of the photo cell device. The same action takes place when the container is filled to too high a lever as to level H.

According to our invention therefore, it will be seen that the photo cell scanning device for detecting improperly filled containers is made operable to inspect and possibly eject a container only by action of the container itself momentarily causing raising of the shutter to cut off the pilot light beam. The relative location of cam surfaces 55 and 38 is selected so that shutter 24 is not raised to cut off the light beam until container A has advanced sufficiently into the measuring station so that its forward upper closure flap will not cut off the light projected downwardly from lamp housing 17. This is a delicate matter of timing which assures operation of the device and insures that the level of the substance in container A is momentarily subjected to the inspection beam only at the proper time and when the photo cell device is conditioned to operate the ejector. The length of time during which shutter 24 remains in the path of the pilot light beam depends of course upon the cooperation between surfaces 55 and 38, and by suitably forming these surfaces any desired length of pilot beam cut-off can be obtained. The length of such cut-off of course determines the inspection interval of the station.

As shown in Figure 7, as soon as face 55 passes beyond face 38 the shutter drops down even though lever 47 is still moving outward. When the container has passed through an inspection station and lever 47 swings inwardly to its normal position above the conveyor bolt, latch 36 simply rocks clockwise about arbor 35 and does not interfere with such inward movement of the lever. Latch 36, after passage of trip 54 in either direction, is forced through gravity by reason of its shape and manner of free pivoting to drop to the normal full line position of Figure 7, and is ready to assist in again raising the shutter upon the next swing of lever 47.

While the longitudinal spacing of containers A is not important, it is essential only that they be sufficiently spaced to allow a return swing of lever 47 sufficient to locate cam face 55 inwardly of latch 36 after each inspection interval, so as to condition the apparatus for the next inspection interval.

While we have indicated at N a proper level for the substance in container A, it will be understood that in practice there will be a permissible variation in level N of a fraction of an inch in either direction. The circuits are so designed and adjusted that the photoelectric cell is adequately excited when receiving total light corresponding to the minimum amount of reflected light it receives from the surface of the substance in the container throughout the range of permissible levels. This range corresponds to the above mentioned regulations.

The invention has been described as including a mechanism for ejecting improperly filled packages. This is the preferred form of the invention, but it will be understood that the principles of the invention may be easily adapted to the utilization of the invention simply to stop the movement of the conveying apparatus when an improperly filled package is detected.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for checking the level of a substance in a container comprising a photoelectric inspection device having means for directing a beam of light onto said substance and light sensitive means for receiving light reflected from said substance, means for providing a pilot light beam for directing light onto said light sensitive means, a shutter, and means operated by positioning of said container adjacent said device for momentarily interposing said shutter in the path of said pilot light beam so that said light sensitive means is exposed only to light reflected from said substance for a limited inspection interval.

2. In the apparatus defined in claim 1, said means operated by positioning of the container comprising a movable control member operatively associated with said shutter and adapted to be contacted and displaced by said container.

3. In an inspection apparatus for checking the level of a substance in a container, a photoelectric inspection device comprising a light source arranged to direct a light beam onto the exposed surface of said substance when the container is adjacent said device and light sensitive means arranged to receive light reflected from said surface within predetermined angular limits, an electromagnetic ejector controlled by said light sensitive means, means providing a biasing pilot light for maintaining said light sensitive means inoperative to actuate said ejector, a movable shutter arranged to cut off said pilot light, and means operated by positioning of said container adjacent said inspection device for actuating said shutter to cut off said pilot light and expose said light sensitive means only to light reflected from said substance surface in said container during a limited inspection interval wherein said light sensitive means is operable to actuate said ejector.

4. In apparatus for checking the level of a substance in a moving open-topped container, a conveyor for said container, a photoelectric inspection device comprising means for directing a beam of light onto the exposed surface of said substance and light sensitive means for receiving reflected light from said surface, means providing a pilot light beam directed onto said light sensitive means, a movable shutter, a movable control member extending into the path of said moving container and operably connected to said shutter so that when said container contacts and moves said control member the shutter is moved to cut-off said pilot light beam for a limited inspection interval during which said light sensitive means is exposed only to light reflected from said surface within selected angular limits.

5. In the apparatus defined in claim 4, said control member comprises a resiliently biased pivoted lever swingable transverse to movement of said container.

6. In apparatus for checking the level of a substance in a container, means defining an inspection station comprising light sensitive means and a container handling means operably associated with said light sensitive means, means for directing a beam of light onto said substance wherefrom it is reflected toward said light sensitive means when a filled container is located at said station, and a pilot light beam directed onto said light sensitive means, said pilot light beam being intercepted upon predetermined positioning of a container within said station whereby said light sensitive means is exposed only to light reflected from said substance only during a limited interval while a container is at said station.

7. An apparatus for checking the level of a substance in a succession of containers which comprises in combination means defining an inspection station comprising light sensitive means, a conveyor for transporting a succession of filled containers to said station, a container handling means operably associated with said light sensitive means and adapted to remove improperly filled containers from said conveyor, means for directing a beam of light onto the substance in a filled container located at said station wherefrom it is reflected toward said light sensitive means, and a pilot light beam directed onto said light sensitive means, said pilot light beam being intercepted upon predetermined positioning of a container within said station whereby said light sensitive means can be exposed only to light reflected from said substance during only a limited interval while a container is at said station.

HARLEY ROLAND HUGHES.
CURTIS DARWIN RICE.

REFERENCES CITED

The following references are of record in the file of this patent:

UNITED STATES PATENTS

| Number | Name | Date |
| --- | --- | --- |
| 1,943,278 | Thompson | Jan. 3, 1934 |
| 2,027,595 | Knobel | Jan. 14, 1936 |
| 2,070,339 | Moore | Feb. 3, 1937 |
| 2,142,920 | Rose | Jan. 3, 1939 |